No. 791,535. PATENTED JUNE 6, 1905.
O. BRYANT.
MOLDING MACHINE.
APPLICATION FILED APR. 18, 1900.

12 SHEETS—SHEET 1.

Witnesses.
L. M. Billings.
G. A. Neubauer.

Inventor.
Orrin Bryant.
By A. J. Sangster Attorney.

No. 791,535. PATENTED JUNE 6, 1905.
O. BRYANT.
MOLDING MACHINE.
APPLICATION FILED APR. 18, 1900.

12 SHEETS—SHEET 2.

Witnesses.
L. M. Billings.
G. A. Neubauer.

Orrin Bryant, Inventor.
By A. J. Sangster, Attorney.

No. 791,535. PATENTED JUNE 6, 1905.
O. BRYANT.
MOLDING MACHINE.
APPLICATION FILED APR. 18, 1900.

12 SHEETS—SHEET 5.

Witnesses,
L. M. Billings
G. A. Neubauer

Orin Bryant, Inventor.
By A. J. Sangster, Attorney.

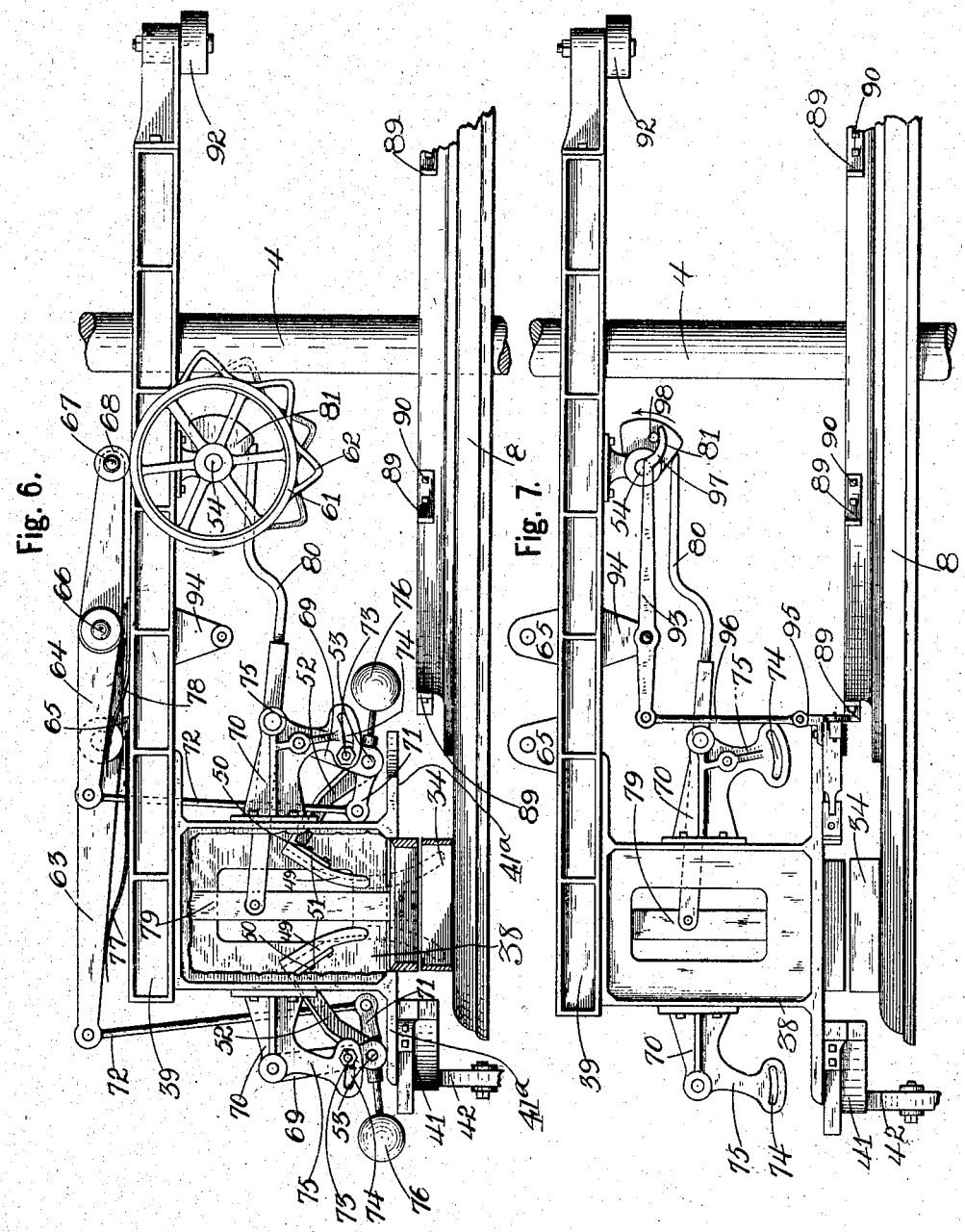

No. 791,535. PATENTED JUNE 6, 1905.
O. BRYANT.
MOLDING MACHINE.
APPLICATION FILED APR. 18, 1900.
12 SHEETS—SHEET 7.
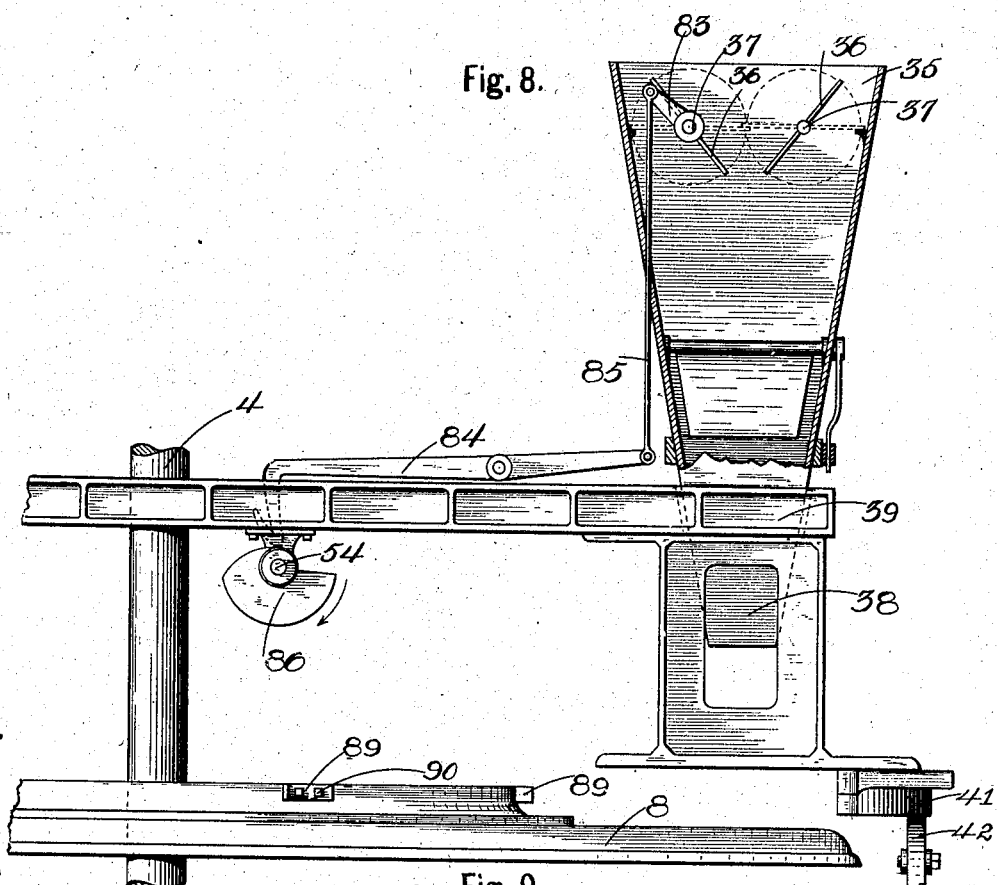
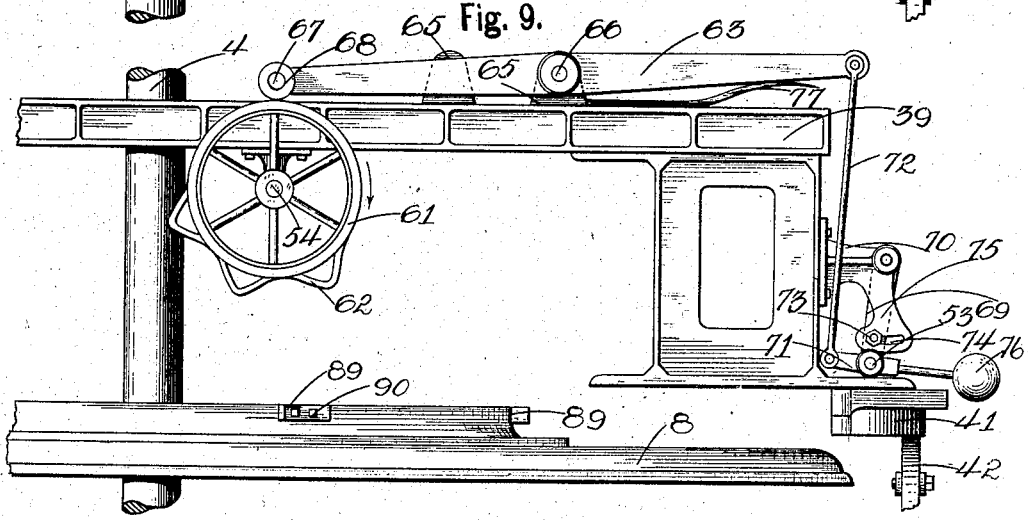
Witnesses
L. M. Billings.
G. A. Neubauer.
Orrin Bryant Inventor.
By A. J. Sangster Attorney.

No. 791,535. PATENTED JUNE 6, 1905.
O. BRYANT.
MOLDING MACHINE.
APPLICATION FILED APR. 18, 1900.
12 SHEETS—SHEET 8.
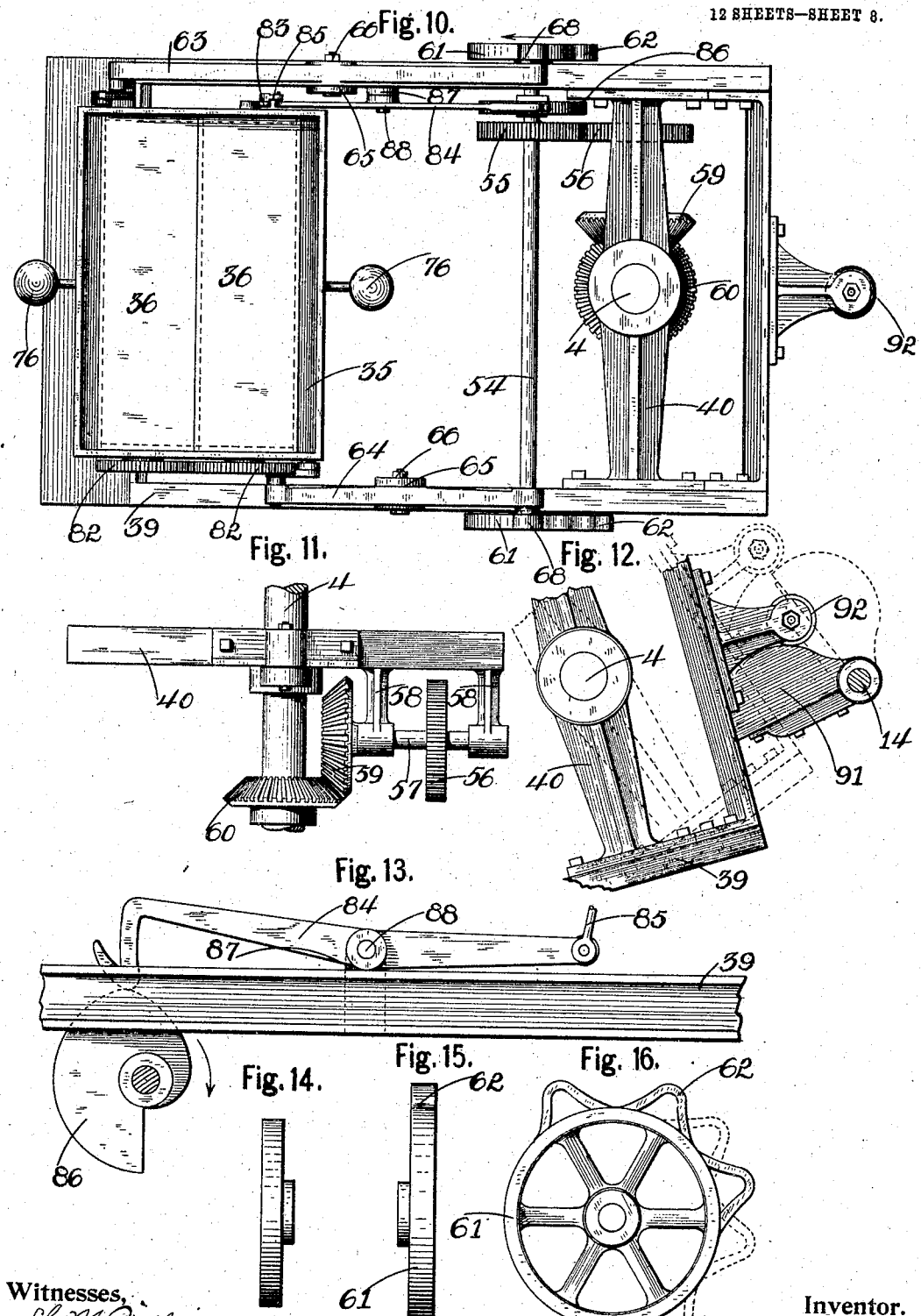
Witnesses,
L. M. Billings
G. A. Neubauer
Inventor.
Orrin Bryant,
By A. J. Sangster Attorney.

No. 791,535. PATENTED JUNE 6, 1905.
O. BRYANT.
MOLDING MACHINE.
APPLICATION FILED APR. 18, 1900.

12 SHEETS—SHEET 9.

Witnesses,
L. M. Billings
G. A. Neubauer

Orin Bryant Inventor.
By A. J. Sangster Attorney.

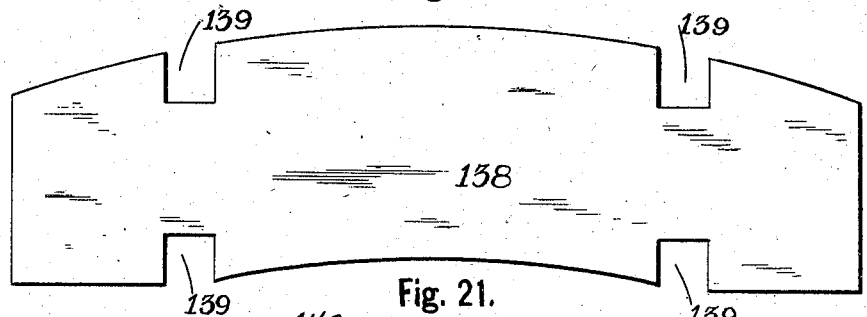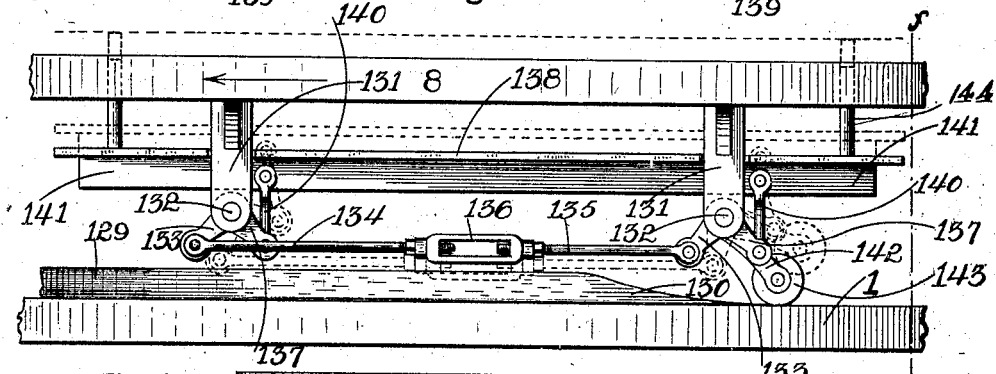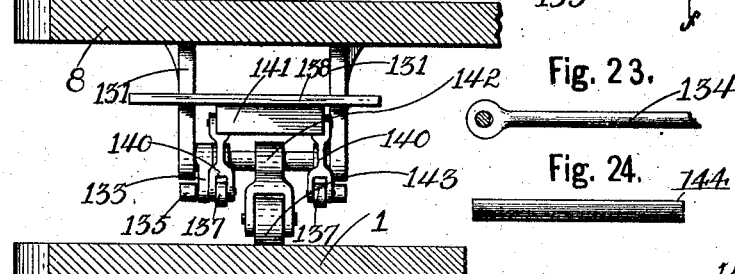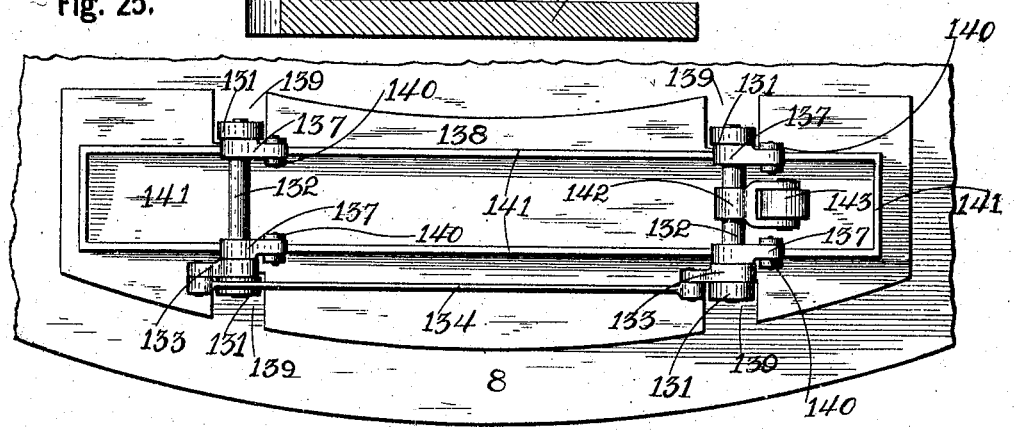

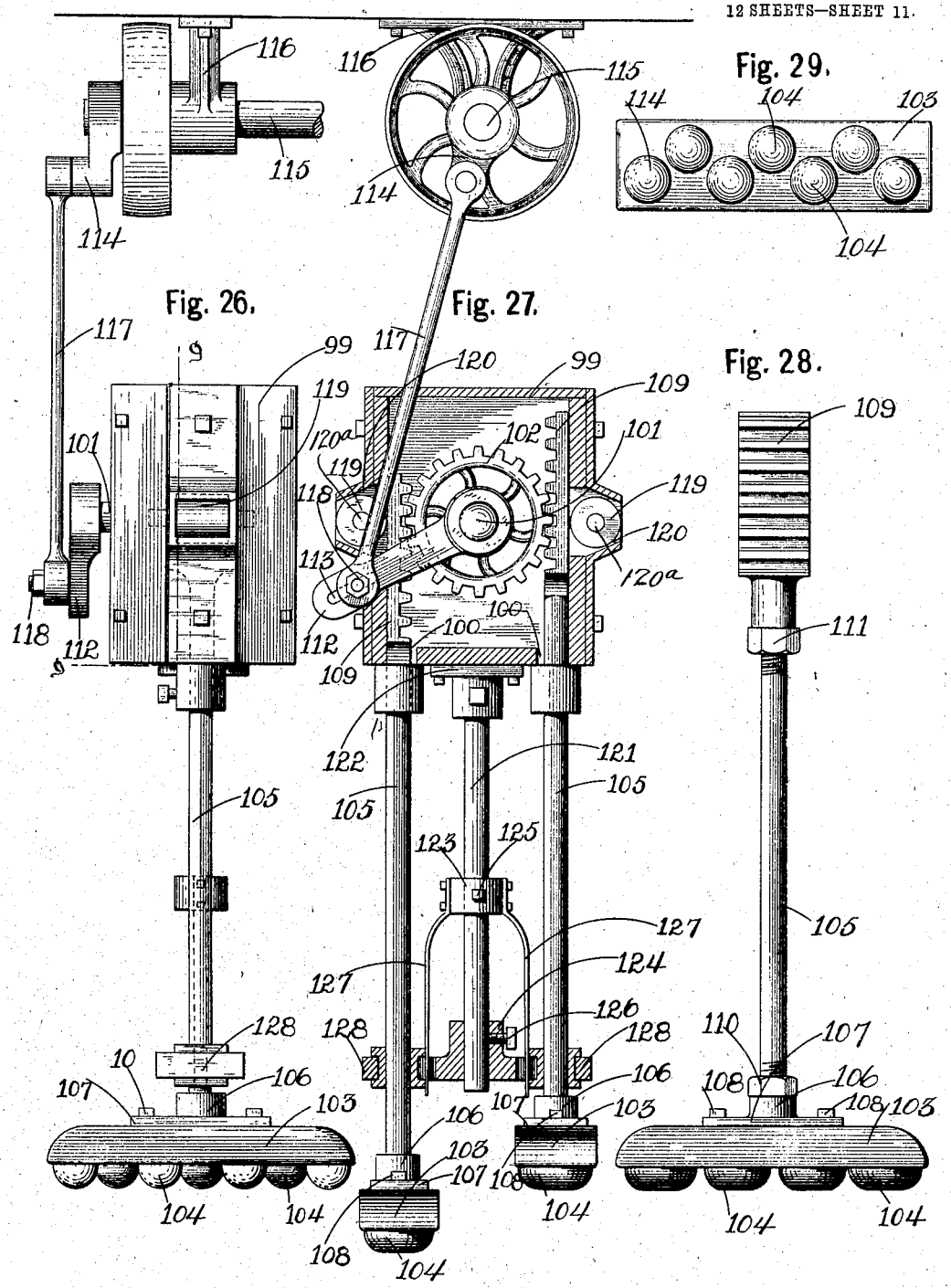

No. 791,535. PATENTED JUNE 6, 1905.
O. BRYANT.
MOLDING MACHINE.
APPLICATION FILED APR. 18, 1900.

12 SHEETS—SHEET 12.

Witnesses.
L. M. Sangster.
Geo. A. Neubauer.

Inventor
Orrin Bryant,
By A. J. Sangster
Attorney.

No. 791,535.

Patented June 6, 1905.

UNITED STATES PATENT OFFICE.

ORRIN BRYANT, OF BUFFALO, NEW YORK, ASSIGNOR TO THE BRYANT IRON WORKS CO., OF BUFFALO, NEW YORK.

MOLDING-MACHINE.

SPECIFICATION forming part of Letters Patent No. 791,535, dated June 6, 1905.

Application filed April 18, 1900. Serial No. 13,312.

*To all whom it may concern:*

Be it known that I, ORRIN BRYANT, a citizen of the United States, residing at Buffalo, in the county of Erie and State of New York, have invented certain new and useful Improvements in Molding-Machines, of which the following is a specification.

My invention relates to an improved molding-machine chiefly adapted to molding radiator-sections in which a plurality of molding devices are arranged upon a movable support; and the main object of the invention is to increase the capacity and efficiency of machines of this character.

It also relates to certain details of construction, all of which will be fully and clearly hereinafter described and claimed, reference being had to the accompanying drawings, in which a preferred adaptation of my machine is shown.

Figure 1:
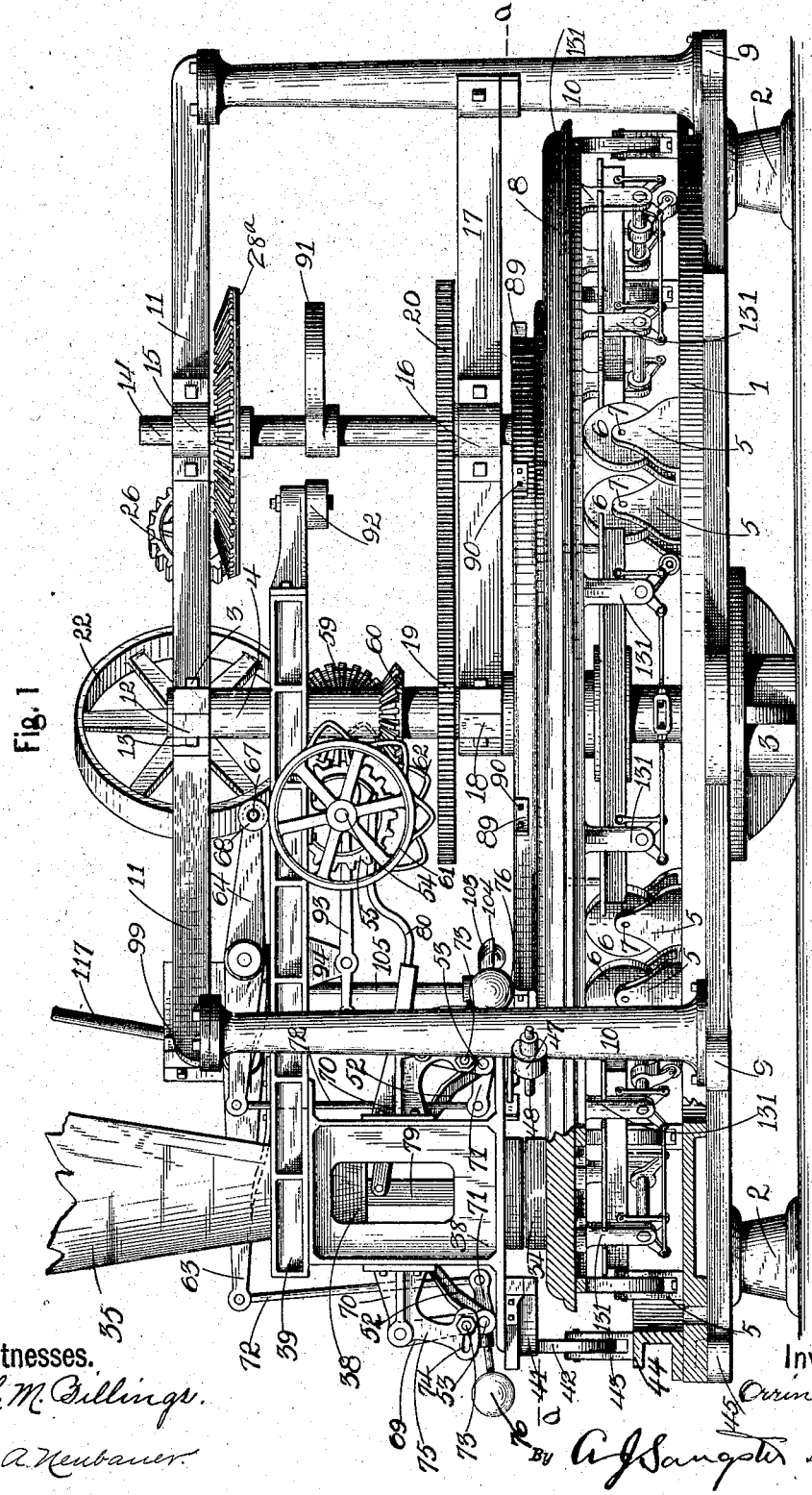
Figure 2:
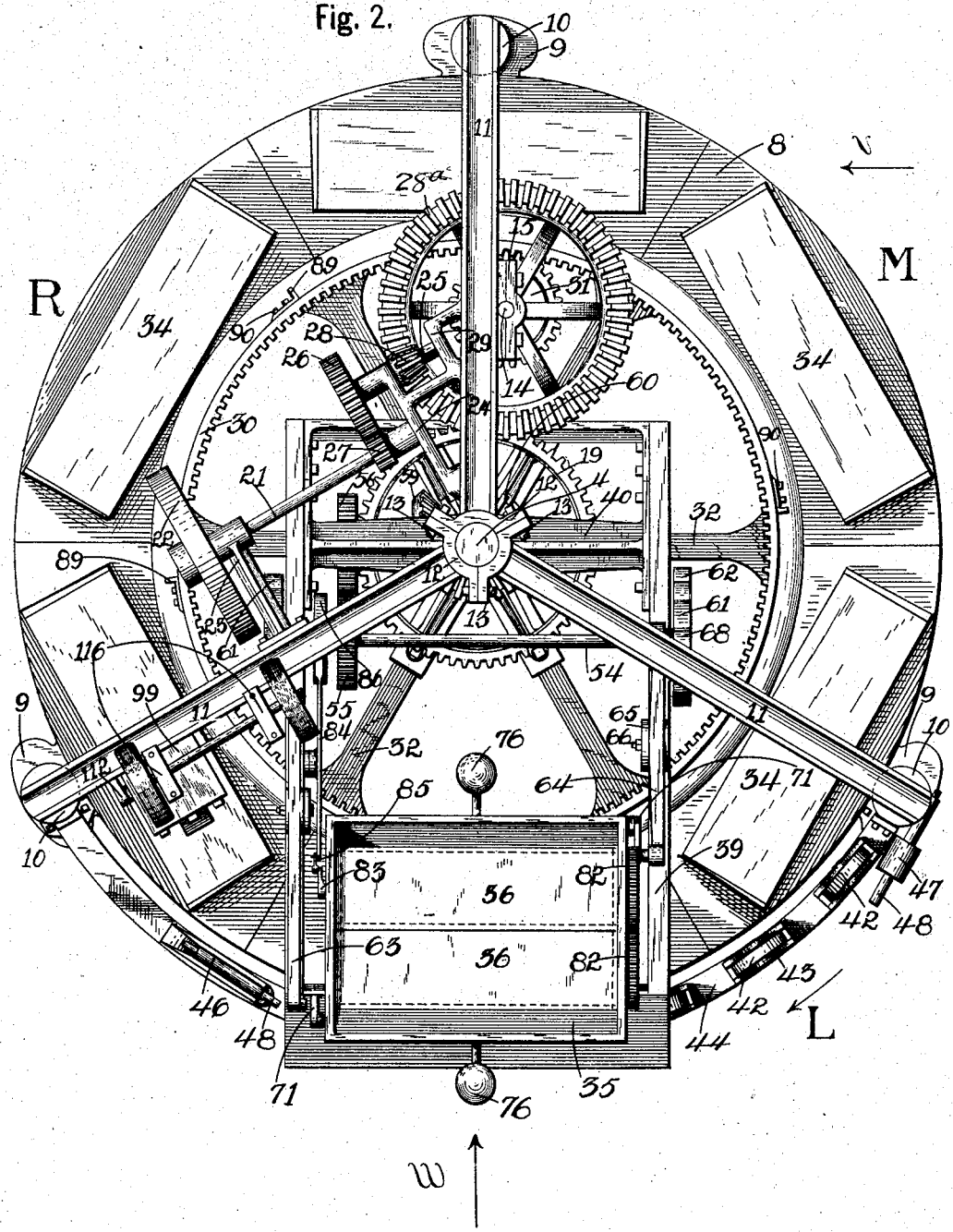
Figure 3:
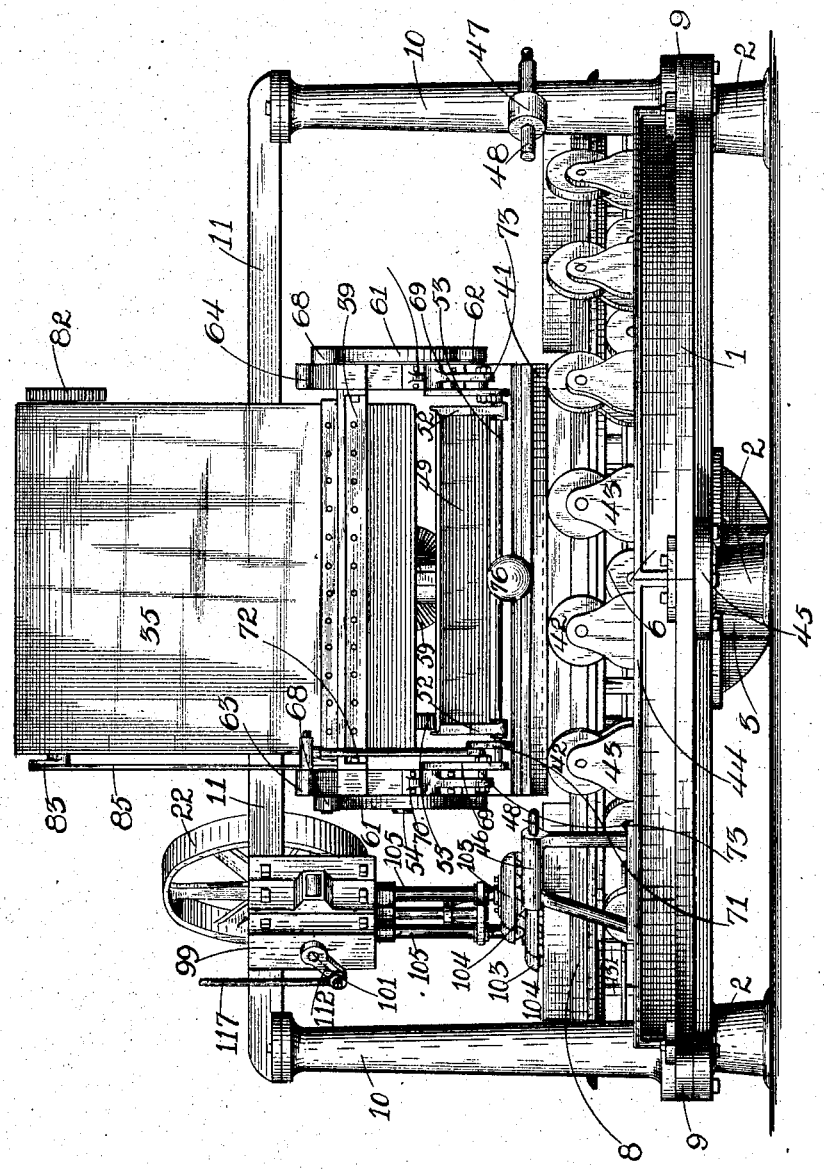
Figure 4:
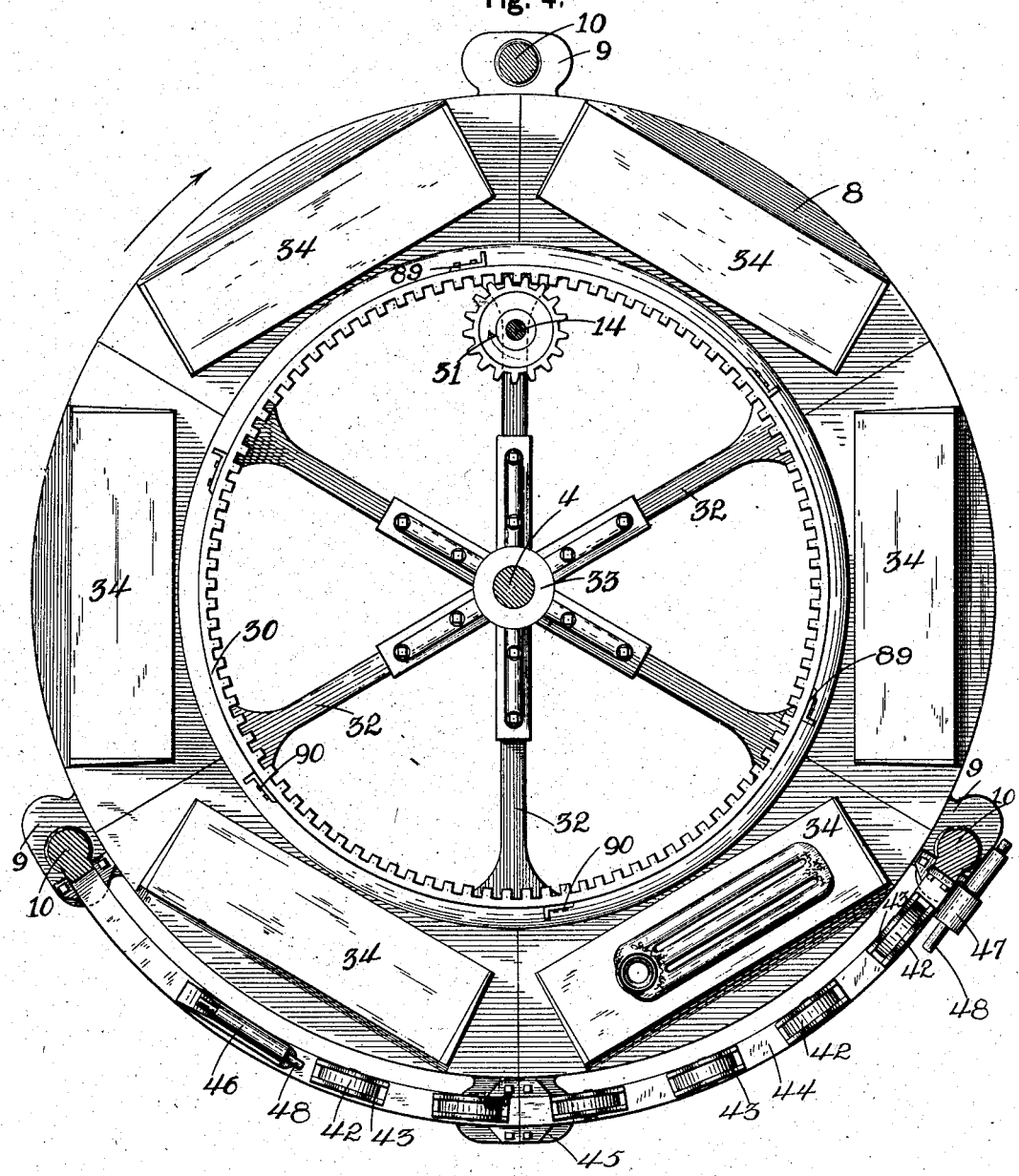
Figure 5:
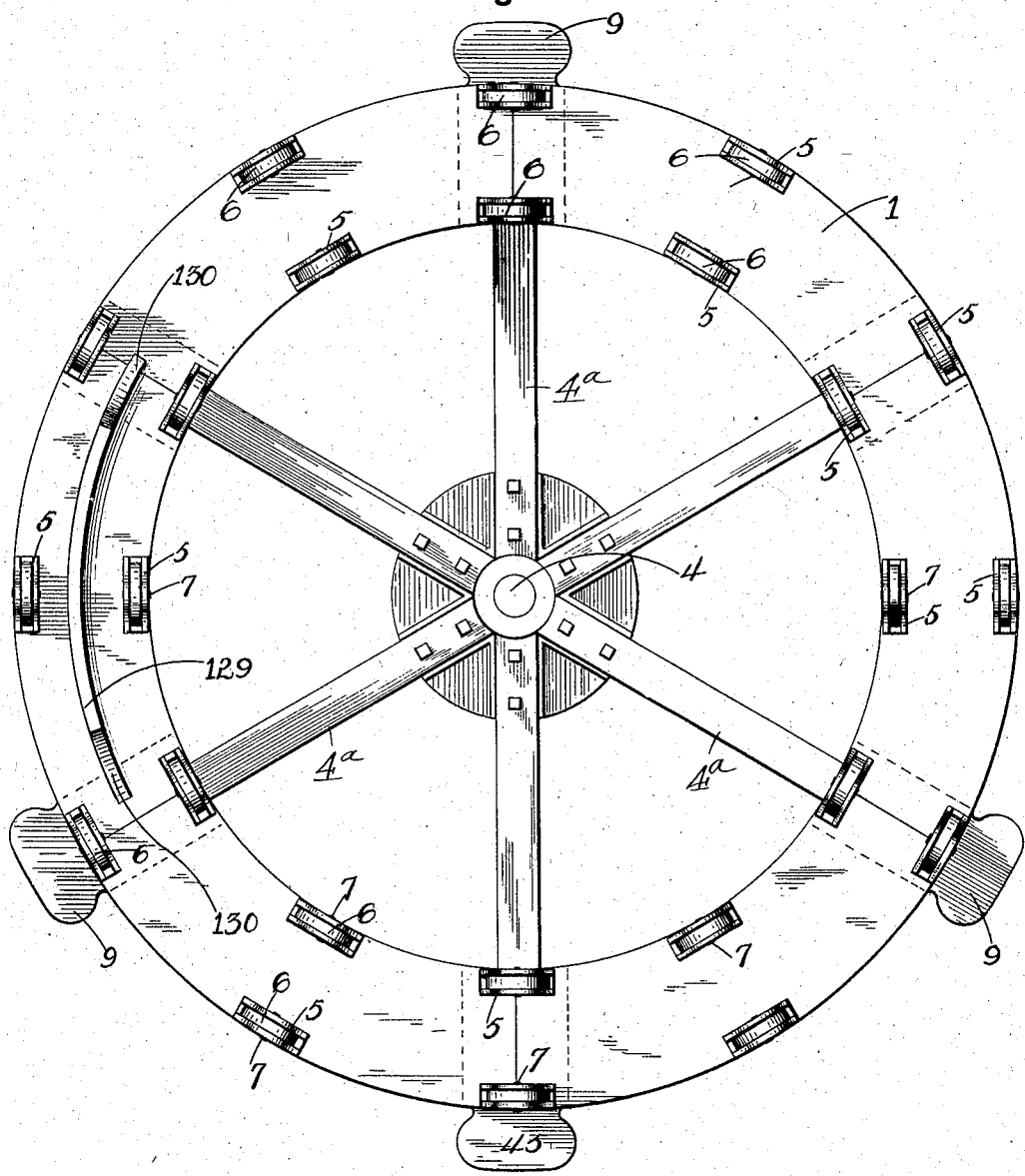
Figure 17:
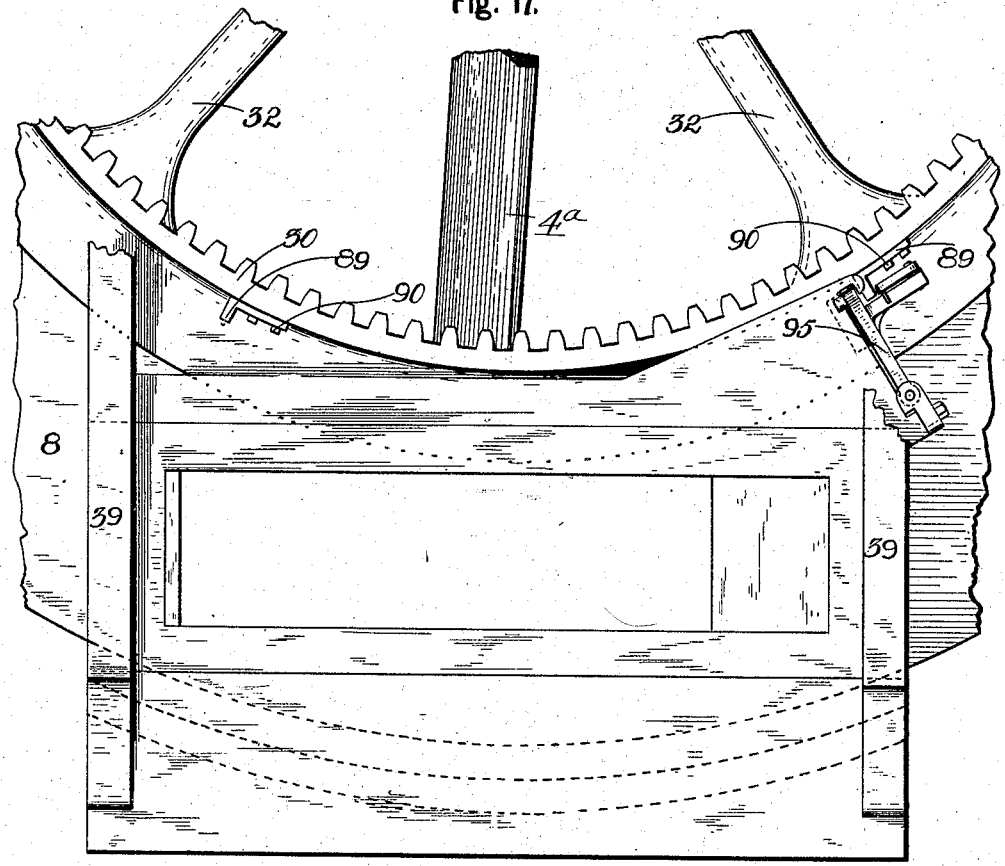
Figure 18:
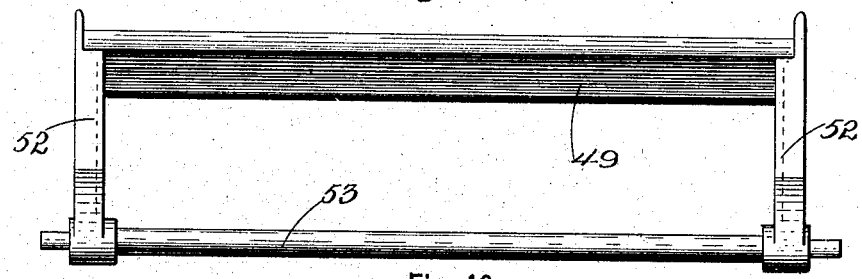
Figure 19:
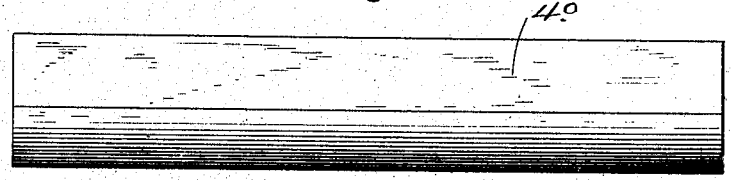
Figure 30:
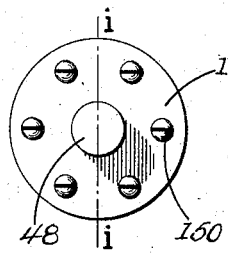
Figure 31:
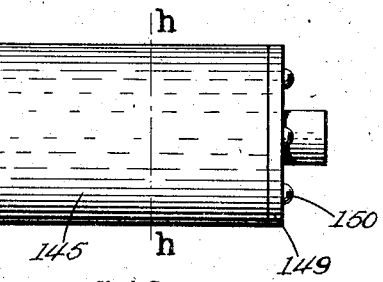
Figure 32:
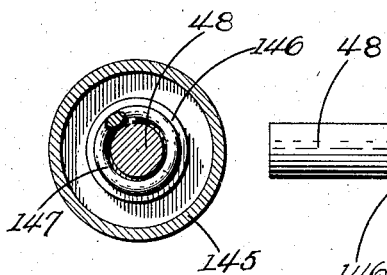
Figure 33:
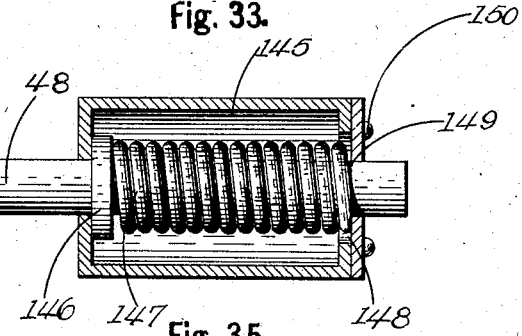
Figure 34:
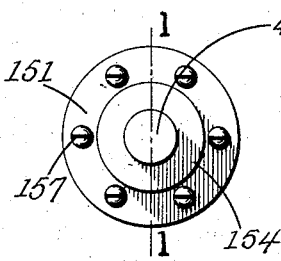
Figure 35:
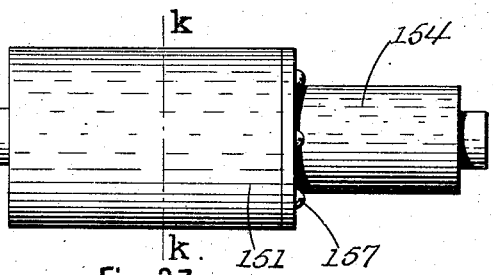
Figure 36:
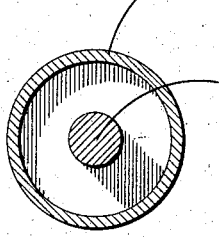
Figure 37:
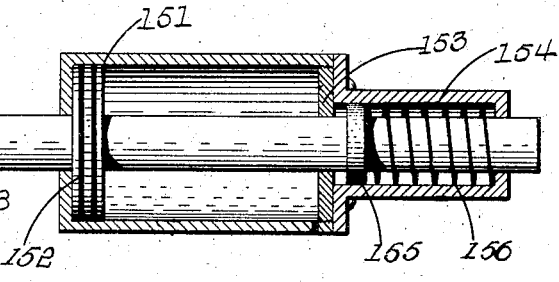

Figure 1 represents a side elevation of my improved machine, partly in section, looking in the direction of the arrow V, Fig. 2. Fig. 2 is a top plan view. Fig. 3 is a side elevation looking in the direction of the arrow W, Fig. 2. Fig. 4 is a horizontal section on or about line $a\ a$, Fig. 1, showing a top view of the movable table. Fig. 5 is a top plan view of the stationary base. Fig. 6 is an enlarged fragmentary view of the machine, partly in section, to illustrate the swinging frame, a section being cut through the chute to show the main ramming-hammers. Fig. 7 is an enlarged fragmentary view of the machine to illustrate the latching device, the ramming-hammers and their operating mechanism being removed. Fig. 8 is an enlarged fragmentary view, partly in section, to illustrate the operation of the swinging doors of the sand-receptacle. Fig. 9 is also a fragmentary view to illustrate the mechanism for operating the main ramming-hammers. Fig. 10 is an enlarged detached top view of the swinging frame. Fig. 11 is a fragmentary view of the shafts and bevel-gears for transmitting power from the main vertical shaft to the devices carried by the swinging frame. Fig. 12 is a fragmentary view of the rear end of the swinging frame and the operating-tappet, illustrating the frame in its forward position in full lines and in its return position in dotted lines. Fig. 13 is a side elevation of a fragment of the swinging frame and the cam and lever for operating the swinging doors of the said receptacle. Fig. 14 is a detached edge view of the cam shown in Fig. 13 for operating the lever. Fig. 15 is a detached edge view of one of the wheels having the cam extensions. Fig. 16 is a side elevation of the wheel shown in Fig. 15, the relative position of its companion wheel being shown in dotted lines. Fig. 17 is an enlarged fragmentary view of the machine to illustrate the latching device. Fig. 18 is an enlarged detached view of one of the main ramming-hammers and its supporting-shaft. Fig. 19 is a detached side view of one of the hammer-blades. Fig. 20 is a detached plan view of one of the lifting-plates. Fig. 21 is an enlarged side elevation of a fragment to illustrate the mechanism for lifting the flasks. Fig. 22 is a section on or about line $f\ f$, Fig. 21. Fig. 23 is an enlarged fragment of one of the connecting-rods. Fig. 24 is an enlarged detached view of one of the lifting-pins. Fig. 25 is a bottom view of a fragment of the table to illustrate the lifting mechanism. Fig. 26 is an enlarged detached end elevation of the supplementary hammers and their operating mechanism. Fig. 27 is a section on or about line $g\ g$, Fig. 26, to illustrate the action of the supplementary hammers. Fig. 28 is a detached side elevation of one of the supplementary hammers. Fig. 29 is a bottom view of one of the supplementary hammers. Fig. 30 is an end view of one form of stop device or cushion. Fig. 31 is a side view of the stop device or cushion shown in Fig. 30. Fig. 32 is a transverse section on line $h\ h$, Fig. 31. Fig. 33 is a longitudinal section on line $i\ i$, Fig. 30. Fig. 34 is an end view of another form of stop device or combined air and spring cushion. Fig. 35 is a side view of the combined air and spring cushion. Fig. 36 is a transverse section on line $k\ k$, Fig. 35. Fig. 37 is a longitudinal section on line $l\ l$, Fig. 34.

In referring to the preferred construction of molding-machine shown in the drawings in detail like numerals designate like parts.

The operating portion of the machine is supported upon a stationary base 1, preferably annular in form, which is mounted upon metal legs 2 and provided with a central socketed portion 3, in which the lower end of a vertical shaft 4 is mounted, said socketed portion resting on the floor or foundation upon which the machine is supported, thereby forming a central support for the stationary base. The annular base 1 is connected to the socketed portion 3 by a series of radial beams $4^a$.

A series of upright bifurcated or forked standards 5 are preferably arranged at equal intervals around the circular base, and a roller 6 is journaled between the forks of each standard on the shafts 7. A movable upper table 8 is journaled concentrically on the shaft 4 and is supported and rotates on the rollers 6.

The stationary annular base is provided with peripheral enlargements 9, preferably three in number, arranged at equal distances apart around the circumference, upon which the lower ends of vertical columns or frame portions 10 are bolted or otherwise rigidly secured, and horizontal top frame portions 11 radiate from a common center and are each rigidly bolted to the upper end of one of the columns 10. These horizontal frame portions 11 are preferably three in number, and their inner ends 12 are shaped so that when bolted together by the bolts 13 a central circular opening is formed in which the upper end of the shaft 4 is journaled. The frame portions 11 are duplicates of each other, and their inner ends 12 are each concaved to form an equal arc of the circle of the opening. (See Fig. 2.)

The shaft 4 is driven from the shaft 14, the upper end of which is journaled in the journal-box 15, secured to an intermediate portion of one of the horizontal frame portions 11. The lower end of the shaft 14 is journaled in the journal-box 16, mounted on an intermediate horizontal frame portion 17, having its outer end rigidly secured to about the middle of one of the vertical columns 10 and its inner end provided with a journal-box 18, through which the vertical shaft 4 passes.

The shafts 4 and 14 are operatively connected by the intermeshing gear-wheels 19 and 20, which are rigidly mounted upon said shafts, and the shaft 14 is operatively connected to a horizontal driving-shaft 21, which has a pulley 22 and is journaled in the frame portions 23 and 24 by an intermediate horizontal shaft 25, having a spur gear-wheel 26, meshing with a spur gear-wheel 27 on the driving-shaft 21, and a bevel gear-wheel 28, meshing with a bevel gear-wheel on the vertical shaft 14. (See Fig. 2.) The intermediate horizontal shaft 25 is journaled to the bifurcated or forked frame portion 29.

The movable upper table 8 is preferably annular in form and has a circular top enlargement provided with a rack of teeth on its interior perimeter, forming an internal gear 30, with which a spur gear-wheel 31, mounted on the shaft 14, meshes. A series of arms 32 radiate from an annular journal-box 33, through which the vertical shaft 4 passes, and are rigidly secured at their outer ends to the annular table 8.

A plurality of flasks or molding-frames 34 for holding sand or other molding material are supported upon the annular table at suitable distances apart and are filled with sand from an overhead sand-box during a portion of the circular rotation of the table. The operating mechanism of the sand-box is automatic in action, and the box is arranged to travel forward and back through an arc of a circle and at a speed substantially uniform with the speed of the rotating table 8 and during its forward movement to automatically fill the flasks with sand. The sand box or receptacle preferably comprises an upper sand-holder 35, having a swinging bottom formed in two parts 36 and journaled on shafts 37, so that they can be swung downward to drop the sand, and a lower chute 38. The sand-holder 35 and the chute 38 are mounted at the outer end of a rectangular frame 49, which is pivotally supported from the vertical shaft 4 by the cross-bars 40, through the central portion of which said shaft 4 passes. (See Figs. 2 and 10.) This frame has a horizontal swinging movement on the shaft 4, which serves as a pivot, and having a bottom platform or base 11 is secured to the under surface of the horizontal bottom extensions $41^a$ of the sides of the sand-chute and rests upon supporting-rollers 42, mounted in forked supports 43, arranged at suitable intervals upon the surface of a curved plate 44. The plate 44 is secured at its ends to the peripheral enlargements 9 and at or near its middle to a peripheral enlargement or lug 45, extending from the base. The movement of the rectangular frame 39 is limited in either direction by stop devices, which to locate them in their position on the machine are designated in Figs. 1, 2, 3, and 4 by the numerals 46 and 47. In the details of these stop devices (shown in Figs. 30 to 37, inclusive) their component parts will be designated by separate numerals.

The main ramming devices for the sand are supported from the sand-chute and preferably comprise right and left peening-hammers 49, each of which is rigidly secured by bolts 50 to the angle portions 51 at the outer ends of angle-arms 52, which extend from the shafts 53. (See Figs. 6 to 18, also Fig. 19, for the preferred shape of the hammers.) These peening-hammers travel in a curved direction and serve to condense or pack the sand into the sides of the flasks.

A horizontal shaft 54 is journaled in bearings in the sides of the rectangular frame in the rear of the sand-receptacle and has a spur gear-wheel 55, which meshes with a spur gear-wheel 56, mounted on a short shaft 57, journaled in the downwardly-extending brackets 58, (see Fig. 11,) and a bevel gear-wheel 59, mounted at one end of said shaft 57, engages with a bevel gear-wheel 60, mounted on the vertical shaft 4. (See Figs. 10 and 11.) Two wheels 61, having one or more curved peripheral projections 62, (see Figs. 1, 6, and 16,) are mounted one at each end of the shaft 54, and walking-beams 63 and 64 are pivoted about midway of their length to the lugs 65, extending upward from the sides of the rectangular frame, by bolts 66, so as to oscillate back and forth on said lugs. One of these walking-beams, 63, is longer than the other, 64, and each are provided with a short projection 67, extending at substantially right angles from one of its ends and carrying a roller 68, which travels upon the periphery of one of the wheels, 61. (See Fig. 1.)

Now referring to Fig. 6, it will be seen that the shafts 53 of the peening-hammers are journaled in the lower ends of arms 69, which hang from brackets 70, bolted to the sides of the sand-chute, (see Fig. 6,) and a lever-arm 71 extends from each shaft and is operatively connected to the outer end of one of the walking-beams by connecting-rods 72. The walking-beam 63 is of greater length than the beam 64 and operatively connects the outer peening-hammer to the operating mechanism. The peening-hammers are adjusted toward or from each other by the bolts 73, extending through the arms 69 and curved slots 74 in the downward extensions 75 of the brackets 70, and are normally retained in an elevated position by the counterbalancing ball-weights 76. The inner ends of the walking-beams are maintained in operative proximity to the periphery of the wheels 61 by the springs 77 and 78, (shown in Fig. 6,) which are rigidly fastened at one end to the sides of the rectangular frame and press against the outer ends of the walking-beams. A central ramming-hammer 79, which operates between the hammers 49, is employed to peen or press the sand in the central portion of the flask and is given a reciprocating vertical movement by an oscillating lever 80, which is pivoted at an intermediate point to the inner bracket 70 and at its outer end to the hammer 79. The inner end of the lever 80 rests against the surface of a cam 81, mounted on the shaft 54. (See Figs. 6 and 7.)

The shafts 37, supporting the swinging two-part bottom of the sand-holder, are geared to each other by spur gear-wheels 82, (see Fig. 10,) so that the swinging of one part of the bottom will give a similar swinging movement to the other part. (See Fig. 8.) An arm 83, extending from one of the shafts 37, is operatively connected to an angular operating-lever 84 by a connecting-rod 85, and a cam 86, mounted on the shaft 54, impinges against the opposite hook-shaped end of the lever 84. (See Fig. 13.) The angular operating-lever 84 is pivoted about midway of its length to an enlargement 87, projecting inwardly from one of the sides of the rectangular frame, by the pin or bolt 88. (See Figs. 10 and 13.)

The rotating table is provided with a series of stops 89, preferably in the form of angle-plates bolted to the exterior of the internal gear 30 by bolts 90, (see Figs. 1, 2, 4, 9, and 17,) and the swinging frame carrying the sand-box and main peening devices is provided with a latching device which is operated automatically to successively catch over the stops to lock the swinging frame to the continuously-rotating table and turn it in unison with the table for a portion of its rotation, the latching device being retracted at the limit of the movement of the swinging frame to release it from the table and permit it to be moved in the opposite direction to its former position in time to be locked to the next stop.

The swinging frame when carried to the limit of its range of movement is preferably returned or swung horizontally to its former position by a tappet 91, mounted on the vertical shaft 14, which bears against a roller 92 at the inner end of the swinging frame. (See Fig. 1, also Fig. 12, in which part of the frame and tappet are shown in one position in full lines and in the other position in dotted lines.)

The preferred construction of the latching device is shown in Figs. 7 and 17, in which an operating swinging arm 93 is pivoted to a depending lug 94, extending downward from one side of the swinging frame, and is connected to a latching device 95, adapted to catch over the extensions of the angle-plates by a connecting-rod 96. The opposite end 97 of the arm 93 is of a curved or angular formation and is operatively arranged beneath a pin 98, projecting from the cam 81. (See Fig. 7.)

A series of supplementary ramming-hammers are arranged at one side of the swinging frame and are operated more rapidly than the main hammers. These hammers operate over the entire surface of the mold after it comes from the main hammers and serve to render the ramming and condensing of the sand more thorough and even, making the mold more perfect, so that it will leave the pattern without breaking and the casting will be of a more uniform thickness and weight. The preferable forms of these supplementary hammers are shown in Figs. 26, 27, 28, and 29 and consist of a casing or box 99, having openings 100 in its bottom, through which the upper end of the hammers pass. A horizontal shaft 101 is journaled in the casing or box 99, and a gear-wheel 102 is mounted on said shaft. The hammers consist of a bottom plate 103, having enlargements 104 on its under surface, the rod 105, which is fastened to the bottom plate 103 by being screwed into the central screw-threaded collar 106 of the bracket 107, bolted to the plate by the bolts 108, and the upper toothed rack portion 109, which is fastened to the upper end of the rod 105 by screwing the upper end of the rod into the lower part of the rack portion. The enlargements 104 may be formed nearly as broad as the width of the plate 103, as shown in Figs. 27 and 28, or sufficiently smaller to be arranged in two series, as shown in Figs. 26 and 29. The hammers are adjustable in length to a certain extent by screwing or unscrewing the bottom plate and the toothed rack portion upon the end of the rod, and the bottom plate and toothed rack portion are locked in position by the lock-nuts 110 and 111. Two hammers are preferably employed, and they are arranged with one on each side of the gear-wheel 102 and their toothed rack portion meshing with said gear-wheel 102, substantially as shown in Fig. 27. A vibratile arm 112 extends from the shaft 101 and has a longitudinal slot 113 in its outer end and is operatively connected to a crank-arm 114, extending from a shaft 115, journaled in brackets 116, hung from the ceiling of the shop or room by a connecting-rod 117, the lower end of the connecting-rod being connected to the vibratile arm by a bolt 118, passed through the end of the rod and the longitudinal slot in the arm. The length of the range of movement of the vibratile arm is varied or regulated by adjusting the bolt 118 in the longitudinal slot in the arm, thereby adjusting the stroke of the hammers. A roller 119 is rotatably mounted in an opening 120 in the side of the box behind the upper end of each of the hammers and acts as a rolling support for the same on a short horizontal shaft 120ᵃ. (See Fig. 27.) A vertical rod 121 is rigidly attached at its upper end to a bracket 122, bolted to the bottom of the box midway between the hammers, and carries a guiding and supporting device for the lower portions of the hammers at its lower end. The preferable form of this guiding and supporting device is shown in Fig. 27, in which upper and lower collars 123 and 124 are mounted on the vertical rod 121 and are vertically adjustable thereon, being locked in their adjusted position by the screw-bolts 125 and 126. These collars are connected to each other by the metal portions 127, and the lower collar 124 is provided with extensions 128, having openings through which the rods of the hammers pass and which form supporting-slideways for said hammers.

The construction and operation of the mechanism for elevating and lowering the flasks on the rotating table at a certain point in its revolution are shown in Figs. 20, 21, 22, 23, 24, and 25. A raised rib or rail 129 is rigidly fastened upon the top of the stationary base and is beveled at each end to form an incline, substantially as shown at 130 in Fig. 21. Four legs or brackets 131, arranged in pairs, are secured to the under surface of the movable table, and a short horizontal shaft 132 is journaled in the lower ends of each pair of legs. The shafts are each provided with a crank-arm 133, and the crank-arms are connected together by an extensible connecting device formed of two rods 133 and 135, united by a turnbuckle 136. (See Fig. 21.) The shafts are also each provided with a pair of supporting crank-arms 137, and a plate 138, formed substantially as shown in Fig. 20 and having side depressions 139 to receive the lugs or brackets 131, is supported by the rods 140, which are pivotally connected to the bottom strengthening-ribs 141 of the plate and the crank-arms 137. An operating-arm 142 also extends from one of the shafts and carries a roller 143 at its lower end, which travels upon the rib or rail 129.

Mechanism of the above character is arranged beneath each portion of the rotating table supporting a flask, and the rib or rail is arranged so that the flask will be lifted off the pattern after the mold has been properly formed by means of the vertical pins 144, extending upward from the plate 138, and the operation of elevating the plate will be clearly understood by referring to Fig. 21, the rollers 143 moving up the inclined end of the rib or rail 129 from the position shown in full lines to the position shown in dotted lines, and thereby partially rotating the shafts 132, turning the supporting crank-arms 137 upward and vertically elevating the plate through the connecting-rods 140.

Two different forms of the stop devices 46 and 47 are shown in Figs. 30 to 37, inclusive, the detail parts of which are designated in said figures by the following numerals: In the form of stop shown in Figs. 30 to 33 the stop-pin 48 passes through an inclosing case 145 and has an enlargement or shoulder 146, against which one end of a coil-spring 147, encircling the pin 48, passes. An opening 148 is formed at the opposite end of the inclosing case 145 of sufficient size to permit the introduction or withdrawal of the pin 48 and spring 147. This opening is partially closed by an end plate 149, which is provided with a central opening for the passage of the pin 48 and is secured to the end of the inclosing case by screws 150 or other suitable fasteners. In the construction shown in Figs. 34 to 37, inclusive, the pin 48 passes through an air-cylinder 151 and is provided with a piston-disk 152. The open end of the air-cylinder is closed by an end plate 153, from the opposite face of which a spring-inclosing case 154 extends. The end of the pin 48 passes through the case 154 and has a shoulder 155, which bears against the inner end of the spring 156 within the inclosing case. The end plate 153 is fastened in place by screws 157 or similar devices. It is obvious that many other forms of cushions may be employed and that they may even be dispensed with without materially affecting the operation of the machine. The purpose of the same is to relieve the jar incident to stopping the machine, and thus lessen the wear.

The operation of the machine is as follows: Motion being transmitted to the shaft 14 from any suitable source of power, the rotatable table is revolved in the direction of the arrow L, Fig. 2, by the spur-wheels 31 engaging with the internal gear 30. An operator standing at M now places flasks on the flask-supports on the continuously-rotating table as fast as they come in front of him. Each flask is carried by the continuously-rotating table beneath the swinging frame, which is then locked to the rotating table by the latching device catching over one of the stops, as before described. The swinging frame now travels in unison with the rotating table for a portion of its rotation, and the flask is filled with sand by the opening of the swinging bottom of the sand-box. The sand is condensed or pressed in the corners or sides of the flask by the main pivotal hammers. The swinging frame now reaches the limit of its forward range of movement, and the latching device is released from the stop. The swinging frame is returned to its original position by the tappet in time to operatively engage with the next flask, and the partially-prepared flask passes beneath the rapidly-operating supplementary peening-hammers, which operate over the entire surface of the mold and render the condensing of the sand more perfect. The flask then passes to the point R and is removed by an operator.

I claim as my invention—

1. In a molding-machine, the combination with the main ramming mechanism and means for giving said main ramming mechanism a limited swinging movement, of supplementary ramming-hammers, a stationary support on one side of said main ramming mechanism for said supplementary ramming-hammers and means for reciprocating said supplementary hammers.

2. A molding-machine having a table for supporting a plurality of flasks, a frame having means for supplying sand to said flasks, means for giving said frame a limited horizontal swinging movement, main ramming-hammers carried by the swinging frame, supplementary ramming-hammers arranged to complete the ramming of the sand in the flasks as they come from the main ramming-hammers and means for reciprocating said supplementary hammers.

3. A molding-machine having a flask-supporting table, a swinging frame carrying a sand-receptacle, means for operating the sand-receptacle to fill the flasks with sand, main ramming-hammers pivotally supported from the swinging frame and adapted to peen or condense the sand in the sides of the flasks and a pair of supplementary hammers adapted to condense the sand in all parts of the flask, as set forth.

4. In a molding-machine, the combination with the main ramming mechanism, of supplementary ramming mechanism comprising a casing having slideways, two hammers mounted in said slideways in said casing, the upper ends of said hammers being provided with toothed racks; a horizontal shaft journaled in the casing, a gear-wheel mounted on said shaft and gearing with the toothed racks, a vibratile arm rigidly attached to said shaft and mechanism for vibrating said arm, as set forth.

5. In a molding-machine, the combination with the main ramming mechanism, of supplementary ramming mechanism comprising a casing having slideways, two hammers mounted in said slideways in said casing; the upper ends of said hammers being provided with toothed racks; a horizontal shaft journaled in the casing, a gear-wheel mounted on said shaft and gearing with the toothed racks, a roller in the rear of each rack, a vibratile arm rigidly attached to said shaft and mechanism for vibrating said arm, as set forth.

6. In a molding-machine, the combination with a preliminary sand-pressing mechanism and means for moving said mechanism against the sand, of a finishing set of hammers, and means for reciprocating the hammers of said set at a speed greater than the movement of the preliminary sand-pressing mechanism.

7. In a molding-machine, a stationary base, a frame mounted on said base, a rotatable table supported on said base and having an internal gear, a main vertical shaft centrally journaled in the frame and base, a secondary vertical shaft journaled in the base, a gear-wheel mounted on said secondary shaft and meshing with the internal gear of the rotating table, intermeshing gear-wheels mounted on the main and secondary shafts, a swinging frame mounted on the main shaft, main ramming mechanism supported by the swinging frame, mechanism operatively connected to the secondary shaft for operating said main ramming mechanism and supplementary ramming mechanism supported from the machine-frame, as set forth.

8. In a molding-machine, the combination with a rotatable table carrying flasks and a swinging frame, of a pair of ramming-hammers pivotally mounted in said swinging frame and having a curved path of movement, as set forth.

9. In a molding-machine, the combination with a rotating table carrying flasks and a swinging frame, of a pair of pivotal ramming-hammers having a curved path of movement, a pair of walking-beams pivoted to the swinging frame, a shaft journaled in said frame and having means for operating said walking-beams, and connections between the walking-beams and the ramming-hammers, as set forth.

10. In a molding-machine, the combination with a rotating table carrying flasks and a swinging frame, of a pair of pivotal ramming-hammers having a curved path of movement, a pair of walking-beams pivoted to the swinging frame, a shaft journaled in said frame and having means for operating said walking-beams, connections between the walking-beams and the hammers, and means for adjusting the hammers, as set forth.

11. In a molding-machine, the combination of a stationary base, a rotatable table supported on said base, mechanism for rotating said table, a swinging frame supported from the base, a pair of pivotal side hammers and a center hammer supported from said swinging frame, a shaft journaled in the frame and operatively connected to the table-rotating mechanism, cams mounted on said shaft, and intermediate operating mechanism between the hammers and the cams, as set forth.

12. In a molding-machine, the combination with the main ramming-hammers and means for reciprocating said main ramming-hammers, of supplementary ramming-hammers and mechanism for reciprocating said supplementary ramming-hammers at a speed greater than the main ramming-hammers.

13. In a molding-machine, a flask-supporting table, means for rotating said table, main ramming-hammers, means for giving a limited swinging movement to said main ramming-hammers in unison with the movement of a flask supported on said table, a stationary support above the table, supplementary ramming-hammers in said support and means for reciprocating said supplementary ramming-hammers.

14. In a molding-machine, a stationary base, a vertical shaft journaled in said base, a table supported on said base, a frame hung horizontally from said shaft and above said table, means for giving a limited horizontal swinging movement to said frame, main ramming-hammers carried by said swinging frame, a stationary support above the table on one side of the main ramming-hammers, supplementary ramming-hammers in said support and means for giving a rapid alternating vertical movement to said supplementary ramming-hammers.

15. In a molding-machine, the combination with a frame, means for giving said frame a limited swinging movement, and main ramming-hammers carried by said swinging frame, of a stationary support on one side of the swinging frame, a pair of supplementary ramming-hammers mounted in said support and means for giving a reciprocating movement to said supplementary ramming-hammers at a speed greater than the main ramming-hammers.

16. In a molding-machine, the combination with a table, means for rotating the table, two sets of ramming-hammers, means for reciprocating one set and also swinging it in unison with the rotation of the table for a portion of its rotation, and means for reciprocating the other set.

17. In a molding-machine, the combination with main ramming-hammers and mechanism for reciprocating said main ramming-hammers, of supplementary ramming-hammers and means for alternately reciprocating said supplementary hammers at a speed greater than the main ramming-hammers.

18. In a molding-machine, a rotating table, a frame above the table having a limited horizontal swinging movement, main ramming mechanism carried by said frame, and supplementary ramming mechanism arranged above said table and at one side of said frame beyond the range of its swinging movement, as set forth.

19. In a molding-machine, the combination with the supporting-frame and the main ramming mechanism, of supplementary ramming mechanism, comprising a box mounted on the frame, a shaft journaled in the box, a gear-wheel mounted on the shaft, two hammers having toothed-rack portions meshing with the gear-wheel and means for giving the shaft an oscillating movement.

20. In a molding-machine, the combination with the supporting-frame and the main ramming mechanism, of supplementary ramming mechanism, comprising a box mounted on the frame, a shaft journaled in the box, a gear-wheel mounted on the shaft, two hammers having toothed-rack portions meshing with the gear-wheel, means for giving the shaft an oscillating movement, and means for regulating said oscillating movement to adjust the range of movement of the hammers.

21. In a molding-machine, the combination with the supporting-frame and the main ramming mechanism, of supplementary ramming mechanism, comprising a box mounted on the frame, a shaft journaled in the box, a vibratile arm extending from said shaft, a gear-wheel mounted on the shaft, two hammers having toothed-rack portions meshing with the gear-wheel, a driving-shaft having a crank, and a rod connecting the crank to the vibratile arm, and means for giving the shaft an oscillating movement.

22. In a molding-machine, the combination with the supporting-frame and the main ramming mechanism, of supplementary ramming mechanism, comprising a box mounted on the frame, a horizontal shaft journaled in the box, a gear-wheel mounted on the shaft, vertical hammers having upper tooth-rack portions extending within the box and meshing with the gear-wheel, means for oscillating the shaft and rollers mounted in the box behind the tooth-rack portions of the hammers.

23. In a molding-machine, the combination with the supporting-frame and the main ramming mechanism, of supplementary ramming mechanism, comprising a box mounted on the frame, a horizontal shaft journaled in the box, a gear-wheel mounted on the shaft, vertical hammers having upper tooth-rack portions extending within the box and meshing with the gear-wheel, means for oscillating the shaft and a device suspended from the box for guiding and supporting the lower portions of the hammers.

24. In a molding-machine, the combination with the supporting-frame and the main ramming mechanism, of supplementary ramming mechanism comprising a pair of reciprocating hammers; each hammer consisting of a bottom plate, a vertical rod and an upper toothed-rack portion, a shaft arranged between the toothed racks, a gear-wheel mounted on the shaft and gearing with said toothed racks and means for oscillating said shaft.

25. In a molding-machine, the combination with the supporting-frame and the main ramming mechanism, of supplementary ramming mechanism comprising a pair of reciprocating hammers; said hammers having toothed-rack portions arranged opposite each other, a shaft between said toothed-rack portions, a gear-wheel on said shaft meshing with the toothed-rack portions, and means for oscillating said shaft.

26. In a molding-machine, a base having a raised rib, a rotating table and mechanism for elevating flasks on said table comprising legs or brackets arranged in pairs and secured to the under surface of the table, a horizontal shaft journaled in the lower ends of each pair of legs, a crank-arm mounted on each shaft, a rod for connecting said arms, a vertically-movable supporting-plate having vertical pins extending through the table, connections between the plate and the shafts, and an operating-rod extending from one of the shafts and having a roller which travels on the raised rib, as set forth.

27. In a molding-machine, two sets of ramming-hammers, means for operating the hammers of one set in unison and means for operating the hammers of the other set alternately.

28. In a molding-machine, the combination with the main ramming-hammers and mechanism for operating said main ramming-hammers, of supplementary ramming-hammers and means for alternately reciprocating said supplementary ramming-hammers.

29. In a molding-machine, a table, a sand-delivery mechanism, means for rotating the table, mechanism for oscillating the sand-delivery mechanism, main ramming-hammers, mechanism for operating said main ramming-hammers in a curved path, of supplementary ramming-hammers and means for reciprocating said supplementary ramming-hammers.

30. In a molding-machine, a supporting-frame, a rotating table supported in said frame, a central vertical shaft, a movable frame swinging from said shaft, a sand-holding device mounted on said movable frame, peening-hammers within the sand device and having a curved path of movement and mechanism for operating said hammers including a rod actuated by a cam operated from the central shaft.

31. In a molding-machine, a ramming mechanism comprising a central ramming-hammer and two side ramming-hammers, and means for reciprocating the central hammer in a straight path and the side hammers in a curved path.

32. In a molding-machine, the combination with a frame, main ramming-hammers pivoted to said frame, and mechanism for operating said main ramming-hammers in a curved path, of supplementary ramming-hammers and means for reciprocating said supplementary hammers.

33. In a molding-machine, a ramming mechanism comprising a central ramming-hammer and two side ramming-hammers, and means for reciprocating the central hammer in a straight path and the side hammers in oppositely-curving paths.

34. In a molding-machine, the combination with a flask-supporting element and a ramming and pressing mechanism, of finishing-hammers arranged above the flask-supporting element and means for reciprocating said finishing-hammers to condense the mold evenly throughout after it has been preliminarily rammed and pressed by the ramming and pressing mechanism.

35. In a molding-machine, the combination with a frame and flask supporting element, of two ramming-hammers pivoted to said flask-supporting element and means for operating said ramming-hammers in oppositely-curving paths to peen the sand into the sides of the flask.

36. In a molding-machine, two sets of ramming-hammers, means for operating one set in a curved path and means for reciprocating the other set.

37. In a molding-machine, two sets of ramming-hammers, means for reciprocating the hammers of one set in unison and means for reciprocating the hammers of the other set alternately and at a greater rate of speed than the first-mentioned set.

38. In a molding-machine, two sets of ramming-hammers, means for operating the hammers of one set in a curved path and means for alternately reciprocating the hammers of the other set.

39. In a molding-machine, a flask-supporting element, a movable support, means for moving said support, ramming mechanism carried by the movable support and comprising a central hammer and side hammers and means for reciprocating said hammers in different paths.

40. In a molding-machine, a table, a movable support, a stationary support, a set of ramming-hammers carried by the movable support, a set of ramming-hammers supported by the stationary support, means for rotating the table, oscillating the movable support and operating the hammers of one set carried by the movable support and mechanism for reciprocating the hammers of the set supported by the stationary support.

41. In a molding-machine, two pairs of ramming-hammers, means for operating the hammers of one pair in oppositely-curved paths of movement and means for reciprocating the other pair.

42. In a molding-machine, two pairs of ramming-hammers, means for operating the hammers of one pair in oppositely-curved paths of movement and means for alternately reciprocating the other pair.

43. In a molding-machine, a base, a vertical shaft mounted on said base, a table journaled on said shaft, means for rotating said table, a frame journaled on said shaft, means for oscillating the frame, a set of ramming-hammers carried by said frame, means for operating said hammers in a curved path, a stationary support, a set of hammers supported by said stationary support, and means for operating the hammers of the second set in a straight reciprocating path.

44. In a molding-machine, a base, a vertical shaft mounted on the base, a table journaled on said shaft, means for rotating said table, a frame journaled on said shaft, means for oscillating the frame, a set of ramming-hammers carried by said frame, means for operating said hammers in unison in a curved path, a stationary support, a set of hammers supported by said stationary support, and means for operating the hammers of the second set in a straight alternating reciprocating path.

45. In a molding-machine, a pair of ramming-hammers having toothed portions, a shaft having a gear-wheel arranged between and meshing with the toothed portions, and means for oscillating said shaft.

46. In a molding-machine, two ramming-hammers and means for operating said hammers in oppositely-curving paths.

47. In a molding-machine, a table, means for rotating said table, a frame, means for swinging said frame in unison with the table for a portion of its travel, two ramming-hammers pivoted to said frame and means for operating said hammers in oppositely-curving paths.

48. In a molding-machine, a table, means for rotating said table, a frame, means for swinging said frame in unison with the table for a portion of its travel, two ramming-hammers pivoted to said frame and means for operating said hammers in unison in oppositely-curving paths.

49. In a molding-machine, the combination with a main ramming and pressing mechanism, of supplementary agitating finishing-hammers and means for reciprocating said agitating-hammers to finish and condense the mold evenly throughout after it has been preliminarily rammed and pressed by the main ramming mechanism.

50. In a molding-machine, the combination with the supporting-frame, and the main ramming mechanism, of supplementary ramming mechanism comprising a pair of vertically-operating reciprocating hammers provided with a series of enlargements on their under surface and adapted to finish the mold after a partial peening by the main ramming-hammers.

51. In a molding-machine, the combination with a flask-supporting table, and a main ramming-hammer, of an agitating-hammer and means for operating said agitating-hammer to condense the mold evenly throughout after it has been preliminarily rammed by the main ramming-hammer.

52. In a molding-machine, the combination with the main ramming-hammers, of supplementary agitating-hammers and means for operating said agitating-hammers to finish and condense the mold evenly throughout after it has been preliminarily rammed by the main ramming-hammers.

53. In a molding-machine, a flask-supporting table, means for rotating said table, a main ramming-hammer above the table, means for reciprocating said main ramming-hammer, a supplementary agitating-hammer above the table and on one side of the main ramming-hammer, and means for reciprocating said supplementary finishing-hammer to condense the mold evenly throughout.

ORRIN BRYANT.

Witnesses:
L. M. BILLINGS,
A. J. SANGSTER.